United States Patent [19]

Cinquina et al.

[11] Patent Number: 5,185,429
[45] Date of Patent: Feb. 9, 1993

[54] PROCEDURE FOR THE CONTINUOUS FRACTIONATION OF POLYMERS AND RELATIVE EQUIPMENT

[75] Inventors: Patrizia Cinquina, Novara; Giangaleazzo Triulzi, Milan; Fabio Garbassi, Novara, all of Italy

[73] Assignee: Istituto Guido Donegani S.p.A., Novara, Italy

[21] Appl. No.: 671,429

[22] Filed: Mar. 20, 1991

[30] Foreign Application Priority Data

Mar. 22, 1990 [IT] Italy .................... 19778 A/90

[51] Int. Cl.⁵ .................................... C08F 6/04
[52] U.S. Cl. ........................... 528/503; 528/493; 528/494; 528/495; 528/496; 528/497; 528/498; 528/499; 523/332; 523/335
[58] Field of Search ............... 523/332, 335; 528/499, 528/503

[56] References Cited

U.S. PATENT DOCUMENTS

| | | | |
|---|---|---|---|
| 2,837,504 | 6/1958 | Hanson et al. | 528/503 |
| 2,847,407 | 8/1958 | Hosmer | 528/481 |
| 2,945,016 | 7/1960 | Bendict | 528/503 |
| 2,979,493 | 4/1961 | Axe et al. | 528/503 |
| 4,429,113 | 1/1984 | Wu et al. | 528/487 |

Primary Examiner—Paul R. Michl
Assistant Examiner—Andrew E. C. Merriam
Attorney, Agent, or Firm—Stevens, Davis, Miller & Mosher

[57] ABSTRACT

Procedure for the continuous fractionation of polymers dissolved in a solvent, which includes at least one complete cycle of the following operations:

a. precipitation of a first fraction of polymer inside a first reaction vessel containing the solution;
b. transferring the remaining solution into a second reaction vessel and collecting the above first fraction of polymer precipitated in the above first reaction vessel;
c. precipitation of a second fraction of polymer inside the second reaction vessel; and
d. recycling the remaining solution in the first reaction vessel and collecting the above second fraction of polymer precipitated in the above second reaction vessel.

10 Claims, 1 Drawing Sheet

PROCEDURE FOR THE CONTINUOUS FRACTIONATION OF POLYMERS AND RELATIVE EQUIPMENT

The present invention relates to a procedure for the continuous fractionation of polymers.

More specifically, the present invention relates to a procedure for the continuous fractionation of polymers and the related equipment.

The fractionation of a polymer means separating different types of molecules, using experimental techniques suitable for obtaining homogeneous fractions having a similar molecular weight and structure, and also different types of compositions in the case of copolymers and terpolymers.

Up until now, specialized documentation has concentrated more on problems related to the fractionation of homopolymers, in that the type of heterogeneity examined has been mainly concerned with the molecular weight and possibly microstructural variations due to the occasional presence of chain branches and their length. In this respect, the fractionation of homopolymers has provided important information for interpreting polymerization mechanisms and kinetics such as, for example, variations in kinetic parameters as a function of yield. It has also been extremely important for determining the distribution curve of the molecular weights and the consequent dependence of this on the main physical-mechanical properties of the polymer such as stress resistance, elongation, melting point etc.

However, since industrial polymers consist of copolymers and terpolymers, it is obvious that interest in these techniques should be extended to polymers whose heterogeneity is not only molecular but also based on their composition and microstructure.

One method for determining the molecular weight distribution of polymers is described in U.S. Pat. Nos. 4,674,323 and 4,775,943 where the polymer fractionation is mainly based on size-exclusion chromatography (SEC).

The method described in these patents, however, has the inconvenience of not being able to operate on a large scale and consequently not being able to provide a sufficient amount of fractions for carrying out further analyses.

German patent No. 3,242,130 describes a method for determining the molecular weight distribution of polymers which overcomes the above inconveniences. This method is mainly based on the principle of countercurrent extraction using solvents which present miscibility gaps with the polymer to be treated.

However, even this method has its drawbacks in that it requires large quantities of solvent, it is difficult to determine the solvent/polymer combination to obtain a good fractionation and it works only with the countercurrent extraction technique, consequently not allowing the use of alternative techniques.

An object of the present invention is to provide a procedure for the continuous fractionation of homo and copolymers and also multicomponent polymers, that does not present the drawbacks of the existing methods, which can automatically carry out all the sequences of the analysis following predetermined programs which can be established by the research team and which can therefrom also function without the presence of an operator.

The applicants have discovered that this and other objects, which are evident from this description to experts in the field, can be reached by means of a procedure for the continuous fractionation of polymers dissolved in a solvent, which includes at least one cycle of the following operations:
  a. precipitation of a first fraction of polymer inside a first reaction vessel containing the solution;
  b. transferring the remaining solution into a second reaction vessel and collecting the above first fraction of polymer precipitated in the above first reaction vessel;
  c. precipitation of a second fraction of polymer inside the second reaction vessel; and
  d. recycling the remaining solution in the first reaction vessel and collecting the above second fraction of polymer precipitated in the above second reaction vessel.

Figure 1:
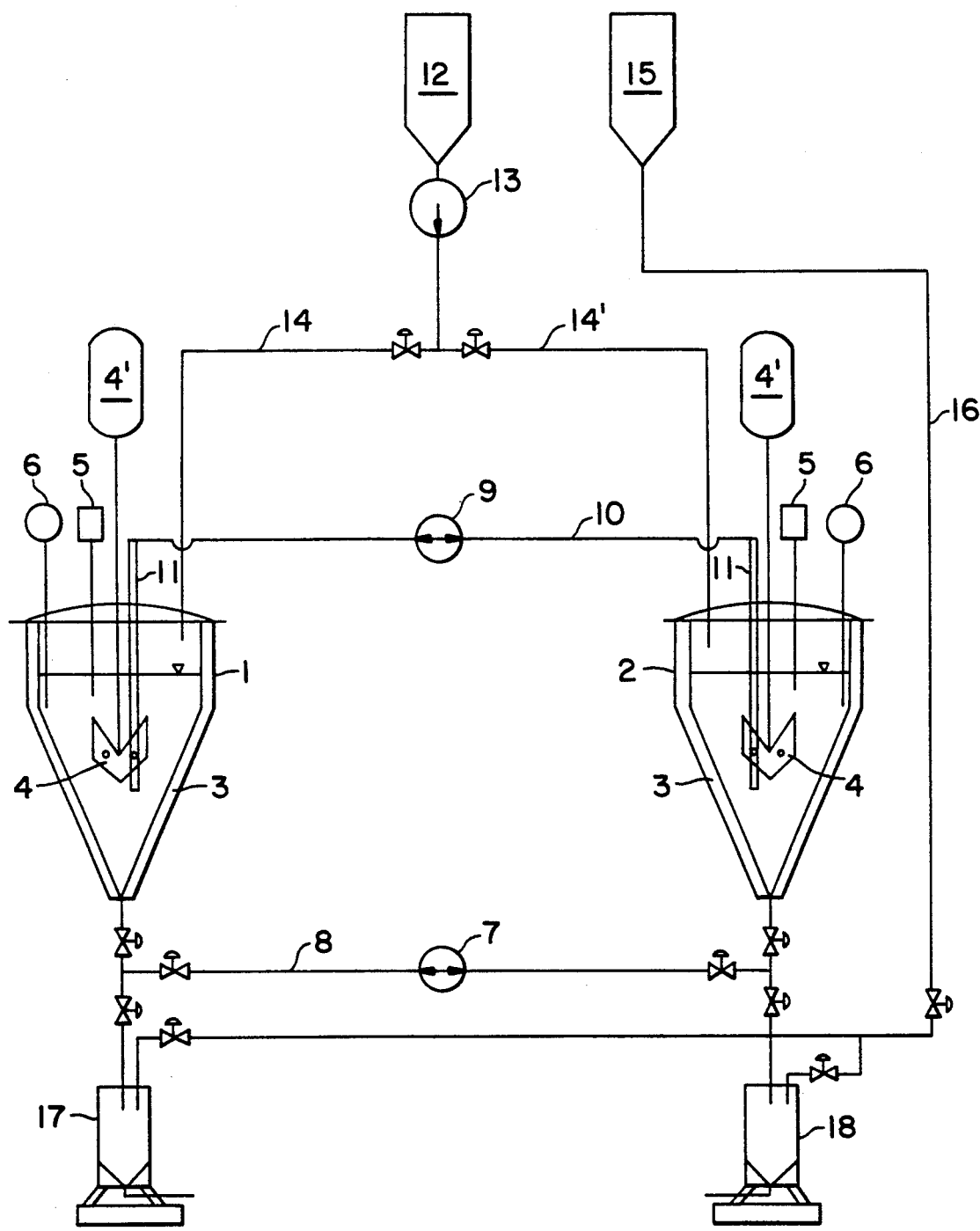
FIG. 1 is a schematic diagram of apparatus used to conduct fractionation of polymers.

Any polymer which is soluble in a solvent may be used in the fractionation procedure described in the present invention. Examples of such solvents include: polyolefins such as high, medium or low density polyethylene, polypropylene, copolymers of ethylene and propylene, copolymers of ethylene and vinyl acetates, poly(iso)-butenes, polyvinylchloride, polystyrenes, styrene-acrylonitrile resins, polybutadiene, ABS, etc., acrylic resins such as polymethyl methacrylate (PMMA), imides of polymethyl methacrylate, or copolymers of methyl methacrylate with styrene and/or alkyl acrylates where the alkyl group is represented by a $C_1$-$C_5$ group, etc., polycarbonate, polystyrene-PMMA mixtures, copolymers of styrene-butadiene, maleic anhydride-methyl methacrylate, ethylene oxide-caprolactone, etc., terpolymers of ethylene-propylene-cyclopentadiene etc.

Similarly, any organic or inorganic solvent normally used for example in physical-chemistry to determine the inherent or intrinsic viscosity of polymers may be used in the present invention. Examples of solvents are: diphenylmethane, alpha-chloronaphthalene, dioxane, decalin, dimethylformamide, acetonitrile, chloroform, cyclohexane, acetone, dimethylsulfoxide, methylethylketone, etc. and normally n-alkanes, alcohols and aromatic hydrocarbons.

In accordance with the procedure described in the present invention, the number of cycles from (a) to (d) depends on the number of polymeric fractions to be collected and above all on the molecular weight distribution of the polymer.

At the end of the fractionation procedure, the solution should preferably, but not necessarily, consist of a solvent containing only a limited quantity of dissolved polymer. The total amount of polymer collected is generally more than 95%.

Bearing in mind that two fractions correspond to each cycle and that these also depend on the type of polymer and solvent being used, between 5 and 10 cycles are the most convenient for the procedure of the present invention.

The polymer may be dissolved in the solvent in a separate container or, more conveniently, in one of the two reaction vessels.

The amount of polymer dissolved should be such as to give very dilute solutions having a concentration preferably of between 0.5 and 2.5% by weight.

When the polymer has been totally dissolved, the fractionation cycles start and the polymer is partially and gradually precipitated in the single and separate fractions.

Any technique which allows the precipitation of a polymer in a solution may be used in the procedure described in the present invention even though it is preferable to adopt the technique which is based on a temperature gradient or where a precipitant is added.

Once the polymer fraction has been precipitated in the desired amount, the solution is brought back to its equilibrium conditions by interrupting the addition of the precipitant or by keeping the temperature constant at the new phase de-mixing temperature.

The collection of the polymer fraction may also be carried out using any technique known to experts in the field. One of these consists of depositing the precipitated polymer fraction on the bottom of a reaction vessel, after the solution has been poured away. The polymer fraction is collected from this reaction vessel by filling the vessel with a fresh solvent in sufficient amount to allow the fraction deposited to be redissolved.

The new solution is poured away from the reaction vessel, for example by letting it flow freely, into a vessel from which the polymer fraction is again collected either by adding a precipitant or by evaporating the solvent.

This recovery technique is preferred in the procedure described in the present invention as it allows the whole fractionation operation to be carried out automatically.

In fact, while the deposit of one polymer fraction is being recovered from the bottom of one reaction vessel, another polymer fraction is precipitated from the starting solution in the other reaction vessel.

The quantity of fresh solvent, used only in the recovery of the polymer fraction deposited on the bottom of one of the two reaction vessels, depends not only on the polymer being examined but also on the type of fraction to be recovered and on the amount of said fraction. However, the amount of fresh solvent for each recovery is normally in the range of from: 10 to 30% of the total quantity of the starting solution.

To obtain a desired quantity of polymer fraction in one of the operations (a) or (c), the precipitation of the polymer is stopped when the solution has reached a pre-established degree of turbidity.

The exact determination of the turbidity of the solution is preferably carried out by immersion of an optical probe, capable of resisting possible corrosive action of the solvent and operating in a temperature range of from $-20°$ to $200°$ C.

The produce described in the present invention can be carried out with equipment for the continuous fractionation of polymers, which includes:
  i) two fractionation reaction vessels suitable for holding a polymer solution, equipped with an external jacket for the circulation of a heating or cooling fluid, a stirrer, a thermometer and an immersible optical probe;
  ii) suitable equipment for transferring the solution from one reaction vessel to the other;
  iii) at least one solvent tank and possibly a tank for a non-solvent; and
  iv) at least two vessels for the recovered polymer fractions coming from the fractionation reactors.

The fractionation reactors are preferably cone-shaped and have a volume which depends on the amount of solution treated. However, for laboratory purposes, volumes of between 1 and 5 liters are more suitable for the equipment herein described. For industrial applications, such as pilot plants, there should be a scale-up according to necessity.

The immersible optical probe, which has been described by the Applicants in a pending patent application, consists of a cylindrical stainless steel probe externally lined with a protective material, such as polytetrafluoroethylene, equipped with a calibrated slit near one of its ends, containing two overlapping water-tight lenses.

On the bottom of the probe, immediately under the slit, there is an optical corner-cube, whereas at the other end there are a beam splitter and a reflecting mirror. The optical probe used also includes a laser which emits a light having a wave-length of 670 nm and a reference system complete with two amplifiers of identical signals, capable of receiving and comparing two light-beams.

When it is operating, the probe is immersed in the solution in such a way that the slit is covered by the liquid. The laser beam is directed against the beam splitter which divides it into two beams: a first reference beam which continues along its original course and, after being amplified, reaches the reference system; and a second measurement beam which is deviated along the probe, reflected back at the bottom of this and is finally deviated by the reflecting mirror to the amplifier and then to the reference system.

During its descent and ascent along the probe, the laser beam passes through the two water-tight lenses and then through the polymer solution present in the slit of the probe.

When the polymer solution begins to become turbid, the intensity of the measurement laser beam decreases. This decrease is registered by the reference system which, by continuous comparison with the intensity of the reference laser beam, is able to automatically stop the precipitation of the polymer fraction at the required moment.

Equipment suitable for recycling the solution mainly consists of a pump a pipe which connects the bottom part of the two reaction vessels if the fractionated polymer has a density lower than that of the solvent, or the upper part if the density of the polymer is higher.

The structural and functional characteristics of the equipment for the continuous fractionation of polymers, as described in the present invention, can be better understood from the detailed description which follows and in which reference is made to the enclosed figure which schematically represents the above as an example, but without limiting it in any way.

With reference to the figure, equipment for the continuous fractionation of polymers, as described in the present invention, includes two fractionation reaction vessels (1) and (2) each equipped with an external jacket (3), a stirrer (4) operated by an engine (4'), a thermometer (5) and an immersible optical probe (6).

The equipment also includes a pump (7) and a pipe (8) which are used only for the fractionation of a polymer having a density which is lower than that of the solvent and which consequently tends to float, and a pump (9) and pipe (10) connected by a pair of aspiration nozzle (11), which operate only when the density of the polymer is higher than that of the solvent and the polymer consequently tends to be deposited on the bottom.

A tank (12) for the solvent connected to the two reaction vessels by means of a pump (13) and pipes (14) and (14'), and a tank (15) for a non-solvent connected by a pipe (16) to the two collecting vessels (17) and (18), complete the equipment necessary for the present invention.

The above description and enclosed drawing adequately demonstrate the functioning of the equipment.

One of the two reaction vessels, for example reactor (1), is filled with the solvent transferred from the tank (12) by means of the pump (13) and pipe (14). As the polymer is put into the reactor, using a method which is not shown in the drawing, the solvent is continuously stirred and, if necessary, a heating fluid circulates inside the jacket to facilitate the dissolution.

This operation is followed by the fractionation, and separation occurs, in this case, by decreasing the temperature. For this purpose a cooling liquid circulates in the jacket (3) which decreases the temperature of the solution. The polymer fraction having the higher molecular weight begins to precipitate and when the immersible optical probe (6) indicates an increase in the turbidity of the solution, the stirrer (4) is stopped by switching off the engine (4') and the temperature of the solution is kept constant at its new equilibrium value.

The precipitated polymer fraction either sinks to the bottom of the reactor or rises to the surface of the solution, depending on its density. In the first case, the remaining solution is transferred into reactor (2) by means of suction from above using the aspiration nozzles (11), a pump (9) and pipe (10) or, in the second case, the solution is transferred into reactor (2) from the bottom of reactor (1) by means of a pump (7) and pipe (8). In both cases the precipitated fraction remains on the bottom of reactor (1).

While a second polymeric fraction is being precipitated in the reactor (2) by further lowering the temperature of the solution, the polymer fraction which has already been precipitated is collected in the reactor (1). For this purpose, fresh solvent is poured from the tank (12) into the reactor (1) in an amount sufficient to dissolve the polymer fraction and the new solution is then transferred to the vessel (17).

The fraction being examined is collected from this vessel by making it precipitate again with the non-solvent conveyed from the tank (15) by the pipe (16).

As soon as reactor (1) has transferred the solution into the vessel (17) it is ready to receive the solution recycled from reactor (2).

After each transfer from one reactor to another, the pipes (8) or (10) and the pumps (7) or (9) are washed using solvents, either similar or different from those previously used, and dried by an inert gas (nitrogen), as shown in the figure.

When the present invention is put into practical use, various parts of the equipment for the continuous fractionation of polymers, shown in the enclosed figure as an example, may undergo changes or modifications which are, however, fully coherent with the present invention and still under the protection given by the patent. For example, one of the modifications could consist of a connection from pipe (16) to the reactors (1) and (2), to obtain the fractionation, at a constant temperature, by adding predetermined amounts of non-solvent from a tank (15).

To enable a clearer interpretation and to allow the practical enforcement of the present invention, the following examples are listed as an illustration of said invention but without limiting it in any way.

EXAMPLE 1

A copolymer of ethylene and propylene, sold by Chemische Werke Huls under the trade name of BUNA AP 301, was fractionated.

The equipment used was that shown in the enclosed figure using fractionation reaction vessels having a capacity of 2 liters.

The solvent used was diphenylmethane and the solution had a concentration of 1% of copolymer.

Before the polymer was dissolved at 160° C., 0.1% by weight of stabilizing mixture made up of equal parts of Irganox 1076 and Irganox 1010 was added to the solvent.

The fractions were collected by gradually lowering the temperature.

The solution, under a nitrogen atmosphere, was steadily stirred and kept still only for the time necessary to collect the fraction.

The number of fractions collected and molecular weight distribution are shown in Table 1.

TABLE 1

Copolymer $C_2$-$C_3$ BUNA AP 301
Fractionation by Temperature gradient

| Frac. | T (°C.) | % W | $\overline{Mw}$ (*$10^{-3}$) | MWD | % $C_3$ (g) | [η] (dl/g) |
|---|---|---|---|---|---|---|
| BUNA AP 301 | — | — | 220 | 2,6 | 43,8 | 1,80 |
| 1 | 120 | 18,10 | 360 | 2,5 | 42,6 | 2,67 |
| 2 | 117 | 18,50 | 250 | 2,3 | 44,4 | 2.30 |
| 3 | 114 | 6,00 | 240 | 1,6 | 43,4 | 2,07 |
| 4 | 112 | 9,90 | 196 | 1,8 | 43,8 | 1,70 |
| 5 | 110 | 6,20 | 174 | 1,6 | 44,0 | 1,52 |
| 6 | 106 | 8,00 | 153 | 1,3 | 44,0 | 1,27 |
| 7 | 95 | 14,00 | 114 | 1,4 | 43,3 | 1,07 |
| 8 | 90 | 4,50 | 82 | 1,4 | 42,9 | 0,92 |
| 9 | 80 | 2,30 | 67 | 1,6 | 42,2 | 0,76 |
| 10 | 70 | 1,90 | 44 | 1,5 | 44,2 | 0,61 |
| 11 | 25 | 2,10 | 22 | 2,5 | n.d | n.d |

$\overline{Mw}$ = weight average molecular weight (calculated by means of the Scholte method)
MWD = degree of polydispersion ($\overline{Mw}/\overline{Mn}$ where $\overline{Mn}$ is the number average molecular weight)
% $C_3$ = amount of polypropylene present (infrared analysis)
[η] = intrinsic viscosity of the polymer

EXAMPLE 2

A polymethylmethacrylate (Vedril 9D of Vedril SpA, Milan) was fractionated after being converted to an imide by reacting it with methylamine at a temperature of 235° C., a pressure of 35 atmospheres and in a 90/10 solvent mixture of toluene/methanol.

The equipment used was that shown in the enclosed figure modified by a connection from pipe (16) to the reaction vessels (1) and (2) having a capacity of 2 liters.

15,252 grams of polymer and 1 liter of solvent (1.4 dioxane) were used for the fractionation.

The fractions were collected by adding a non-solvent (n-heptane) at a steady temperature (T = 30° C).

Table 2 shows the number of fractions collected, the volume of non-solvent added and the characteristics of each fraction.

TABLE 2

| | Imide of polymethylmethacrylate Fractionation by adding non-solvent | | | |
|---|---|---|---|---|
| Frac. | Vol. (ml) | m (g) | [η] (dl/g) | MWD |
| PMMA | — | — | 0.42 | 1.38 |
| 1 | 480 | 0,7008 | 0,71 | 1,53 |
| 2 | 70 | 0,6296 | 0,64 | 1,60 |
| 3 | 20 | 0,8952 | 0,54 | 1,58 |
| 4 | 10 | 1,8764 | 0,52 | 1,35 |
| 5 | 30 | 2,5847 | 0,46 | 1,32 |
| 6 | 50 | 3,0014 | 0,36 | 1,17 |
| 7 | 75 | 1,8104 | 0,33 | 1,20 |
| 8 | 50 | 0,7199 | 0,26 | 1,17 |
| 9 | 100 | 1,2453 | 0,24 | 1,18 |
| 10 | 260 | 1,3093 | 0,18 | 1,28 |
| 11 | 600 | 0,2451 | — | 2,09 |

We claim:

1. A process for fractionating a solution of a polymer dissolved in a solvent, comprising completing at least one cycle comprising the following steps:
   a) precipitating a polymer fraction from the solution inside a reaction vessel by lowering the temperature of the solution to obtain a polymer precipitate and another polymer solution;
   b) transferring the polymer solution obtained in step a) without the polymer precipitate obtained in step a) to another reaction vessel;
   c) collecting the polymer precipitate from step a);
   d) precipitating the polymer fraction from the polymer solution in the reaction vessel of step b) by lowering the temperature of the polymer solution to below the temperature of step a) to obtain a polymer precipitate and another polymer solution;
   e) recycling the polymer solution of step d) to the vessel of step a); and
   f) collecting the polymer precipitate from step d).

2. A method of claim 1, which comprises carrying out 5 to 10 cycles of the process comprising steps a) to f).

3. A method of claim 1 or 2, wherein the polymer solution prior to any precipitation has a polymer content of between 0.5 and 2.5% by weight.

4. A method according to claim 1 or 2, wherein a desired amount of any polymer precipitate from any polymer solution is obtained by stopping the precipitation when the turbidity of the solution reaches a predetermined value.

5. A method according to claim 4, wherein the turbidity of any polymer solution is measured by an immersible optical probe which is capable of operating within a temperature range of −20° to 200° C.

6. A method for continuously fractionating a solution of a polymer dissolved in a solvent comprising at least one cycle of the steps comprising:
   a) precipitating a polymer fraction of the solution inside a reaction vessel containing the polymer solution by adding a non-solvent to the polymer solution to obtain a polymer precipitate and another polymer solution;
   b) transferring the polymer solution of step a) without the polymer precipitate to another reaction vessel;
   c) collecting the polymer precipitate of step a);
   d) precipitating a polymer fraction from the polymer solution in the reaction vessel of step b) by adding a non-solvent to the polymer solution to obtain another polymer precipitate and another polymer solution;
   e) recycling the polymer solution of step d) to the reaction vessel of step a); and
   f) collecting the polymer precipitate of step d),
said method steps being conducted at a constant temperature.

7. A method of claim 6, which comprises carrying out 5 to 10 cycles of the process comprising steps a) to f).

8. A method of claim 6 or 7, wherein the polymer solution prior to any precipitation has a polymer content of between 0.5 and 2.5% by weight.

9. A method according to claim 6 or 7, wherein a desired amount of any polymer precipitate from any polymer solution is obtained by stopping the precipitation of the polymer when the turbidity of the solution reaches a predetermined value.

10. A method according to claim 9, wherein the turbidity of any polymer solution is measured by an amerciable optical probe which is capable of operating within a temperature range of 20° to 200° C.

* * * * *